United States Patent [19]
Daley

[11] 3,834,421
[45] Sept. 10, 1974

[54] PACKER FOR SEALING PIPE LEAKS

[75] Inventor: Daniel R. Daley, Orlando, Fla.

[73] Assignee: Penetryn Products, Inc., Orlando, Fla.

[22] Filed: Oct. 25, 1972

[21] Appl. No.: 300,498

[52] U.S. Cl. ................................. 138/97, 138/93
[51] Int. Cl. ........................................... F16d 55/12
[58] Field of Search ................... 138/90, 91, 93, 97

[56] References Cited
UNITED STATES PATENTS

| | | | |
|---|---|---|---|
| 3,103,235 | 9/1963 | Stringham | 138/97 |
| 3,269,421 | 8/1966 | Telford et al. | 138/97 |
| 3,618,639 | 11/1971 | Daley | 138/97 |
| 3,762,446 | 10/1973 | Tungseth et al. | 138/97 |

FOREIGN PATENTS OR APPLICATIONS

| | | | |
|---|---|---|---|
| 1,224,256 | 2/1960 | France | 138/97 |

Primary Examiner—Charles A. Ruehl
Attorney, Agent, or Firm—Duckworth, Hobby & Allen

[57] ABSTRACT

A packer apparatus for the internal sealing of pipe leaks has a cylindrical casing with a single inflatable sleeve thereon sealed at each end to the casing so that the sleeve may be inflated by the application of air under pressure between the cylindrical casing and the sleeve. The sleeve has a thickened middle portion so that the end portions inflate more rapidly so that when placed in a pipe and inflated, the end portions will form a void area in the middle portion with the walls of the pipe. An air line is connected through the casing for applying air under pressure and a grouting line passes through the casing and through the middle portion of the inflatable sleeve and is attached to the sleeve for applying grouting chemicals to the void area created during the inflation of the sleeve. The grouting line has a flexible portion between the casing and the sleeve to allow the expansion of the inflatable sleeve and skids provided for the packer to ride on when the sleeve is deflated.

6 Claims, 4 Drawing Figures

PACKER FOR SEALING PIPE LEAKS

BACKGROUND OF THE INVENTION

The present invention relates to the internal sealing of pipe leaks and especially to a sleeve type packer for use with fast setting chemical grouts.

The present packer apparatus is especially adapted for use in those systems in which a television camera in a sealed unit may be pulled through a sewer line, or the like, to detect leaks or faults in the sewer line and assist in the positioning of the packer for a fast and easy sealing of a leak by remote control from a mobile unit located near the entrance of the sewer line.

Pipes, such as sewerlines, frequently develop leaks, particularly at the joints between sections of the pipe. Prior to the development of television cameras and internal pipe sealing units, the repair of subterranean pipelines to correct the infiltration of water, and the egress of sewage, had been to calculate strategic locations of infiltration and then to excavate along the pipe line until the leak was located and the repair made. This, however, was time consuming and expensive in the correction of faults in subterranean lines, and it was extremely difficult to locate the exact site of a leak in the pipe. This resulted in experimentations for better ways of locating leaking joints and resulted in sealed camera units, such as TV cameras having lighting units for pulling through the pipe lines to examine the interior of the pipe lines for faults, root damage, and the like. Once a fault or leak was discovered in the pipe and pinpointed with a camera, a hole could be drilled to a spot near the leak and sealing the material fed through conduits could repair the leak. This particular method and apparatus was described in the claims in U.S. Pat. No. 2,971,259, entitled "Method and Apparatus for Determining the Position of Sewer Leaks" by Robert F. Hanou and Edward Diehle Toole, and assigned to the assignee of the present invention.

The next step involved the development of a mechanism for internally sealing a pipe leak, having a packer movable within the pipe along its length for injecting a plugging material into the leak. Such a packer was described in U.S. Pat. No. 3,168,908 for "Mechanism for the Internal Sealing of a Pipe Leak" by James A. Zurbrigen and Jack C. Steinsberger and assigned to the assignee of the present invention. This type of sealing packer was used in association with an enclosed television camera to provide a method for sealing and repairing internal leaks in sewer lines by moving the packer along the pipe until a leak was detected by the television camera, and a target located a fixed distance from the packer positioned under the leak, then advancing the packer a predetermined distance to place the packer directly over the leak, then isolating the leak with the packer and injecting the sealing material. This method was illustrated in U.S. Pat. No. 3,168,909 for "A Method for Locating and Sealing Pipe Leaks" by James A. Zurbrigen and Jack C. Steinsberger, and assigned to the assignee of the present invention. Finally an improved packer mechanism for use for fast gelling chemical grout was provided in the U.S. Pat. No. 3,103,235 entitled "Sleeve Packer for Chemical Grouting" by Edward B. Stringem III, and assigned to the assignee of the present invention in which a sleeve-type packer was provided having a sleeve covered by an inflatable bladder and sealed at each end, and having another rigid sleeve placed over the bladder, and in the middle thereof, to provide a packer adapted for fast gelling grouts.

A simplified packer apparatus which was easily assembled and disassembled for ease in manufacture and also to simplify replacing damage to worn parts is shown in U.S. Pat. 3,618,639 for "Packer for Sealing Pipe Leaks" and assigned to the assignee of the present invention. Some of the techniques used in this patent have also been incorporated into the present system. More recently, however, new grouting chemicals have been used in the industry and which grouting chemicals set more rapidly and are much harder so that it is no longer practical to seal a fault in a pipe leaving large amounts of grouting chemicals stuck to the pipe which are then knocked loose with the skids of the packer as it is pulled along the pipe. That is, the chemical is set up with a hardness that it makes it difficult to knock excess material loose from the internal walls of the sewer line. Accordingly, it has been necessary to provide packers which expand in the middle portion of the packer to drive the grouting chemicals into the faults in the sewer lines. This technique, however, is not new inasmuch as prior art packers have utilized a third middle inflatable bladder to drive the chemicals into the faults and leaking joints in the pipe lines. It has also been suggested to provide one bladder riding over two smaller bladders at each end.

The present invention provides a simplified packer apparatus for forcing excess grouting chemicals into faults in pipe lines which has the advantages of being easily manufactured as well as disassembled for replacing of worn or damaged parts.

SUMMARY OF THE INVENTION

A pipe leak sealing mechanism is provided having a single cylindrical casing member with gas impervious inflatable sleeve mounted over the cylindrical casing. The sleeve has two end portions and a center portion, with the center portion being more slowly inflatable by being thicker than the end portions, or alternatively having a second sleeve attached in the middle portion to reduce the expansion of that portion relative to the end portion. The two end portions are attached to their respective ends of the casing in an air or gas-tight seal so that air pressure can be supplied between the casing and the sleeve to inflate the sleeve. A gas line is connected through the casing for applying a fluid between the casing and the sleeve for inflating the sleeve, the sleeve inflating more rapidly at the end portions than the middle portion so that the end portions will engage the internal walls of a pipe leaving a void therebetween and a grouting line is connected through the casing and through the middle portion of the sleeve for directing settable grouting chemicals to the void portion so that additional pressure applied between the sleeve and the casing will further drive the chemicals in the void area into a crack or fault in the pipe line. The grouting line includes a flexible line connected to the sleeve having a flexible portion between the sleeve and casing to allow the sleeve to expand and the casing has a recessed area for holding the flexible portion of the grouting line therebetween. Skids are attached to each end of the packer for the packer to ride on when the sleeve is deflated.

BRIEF DESCRIPTION OF THE DRAWINGS

Other objects, features and advantages of this invention will be apparent from a study of the written description and the drawings in which.

DESCRIPTION OF THE PREFERRED EMBODIMENT

Figure 1:
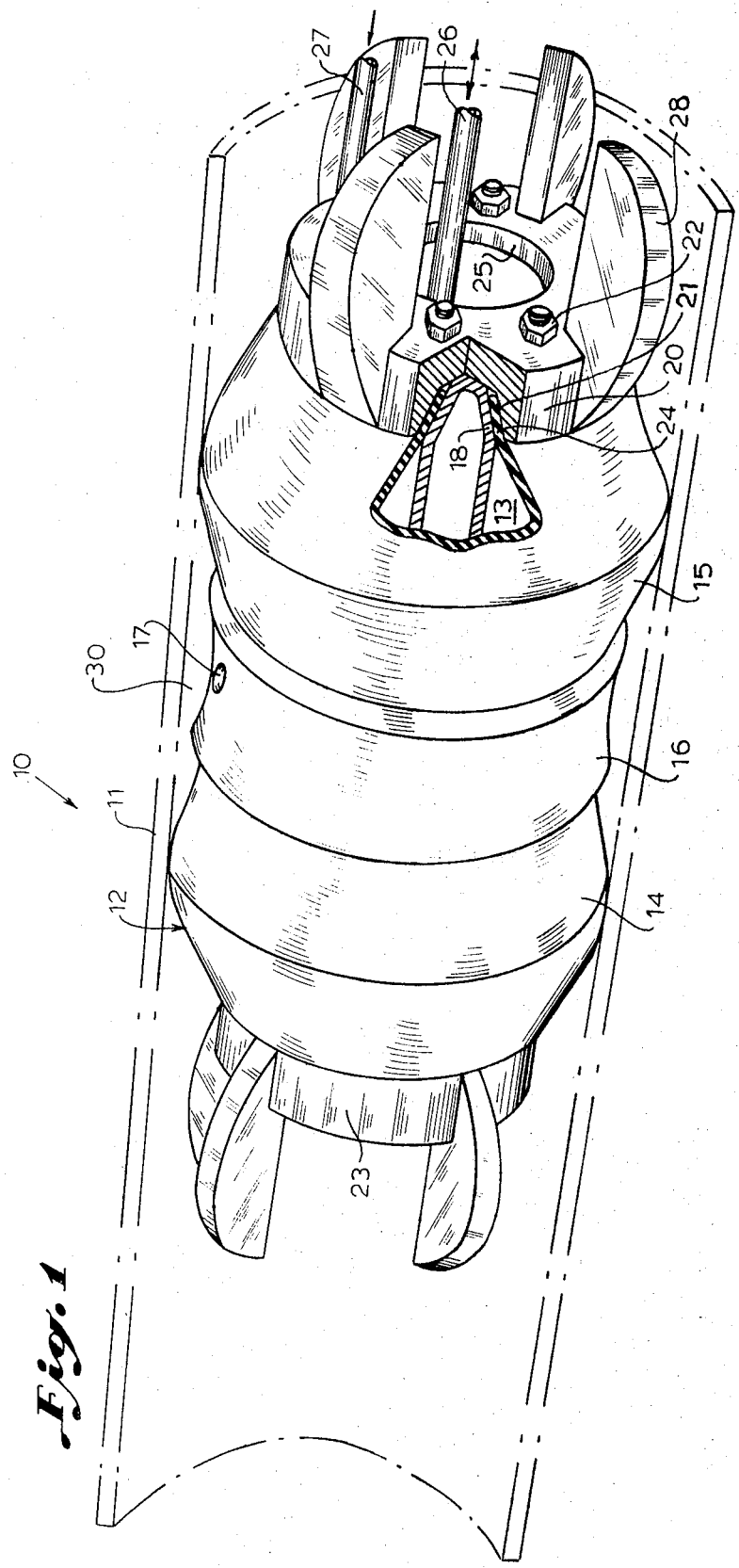
FIG. 1 is a perspective view of one embodiment of the present invention having a portion cut away and being illustrated in a sewer line and partially inflated.

Referring now to FIG. 1, a packer apparatus 10 for the internal sealing of pipe leaks is illustrated in a sewer line 11 and having a single inflatable bladder or sleeve 12 placed upon a generally cylindrical casing 13 and having end portions 14 and 15 and a middle portion 16. The middle portion can be seen as having a greater thickness than the end portions 14 and 15. This allows for the bladder 12 to expand more rapidly in the end portions 14 and 15 than in the middle portion 16. The middle portion 16 can have its expansion reduced in several ways including having a single sleeve 12 which has increased thickness molded in its center portion 16, or alternatively a sleeve 12 of uniform thickness can be utilized with a separate sleeve of the same material placed over the middle portion 16 and glued or otherwise attached to the sleeve 12. A separate sleeve could also be made of a material having a different modulus of elasticity, if desired, to control the rate of expansion of the middle portion 16. The middle portion 16 includes an opening 17 through which grouting chemicals are applied during the sealing of a pipe leak. The sleeve 12 is sealed to the casing 13 onto beveled portions 18 located on each end of the casing 13 and by having a pair of end members 20 having annular beveled edges 21 of a size to fit just over the end of the casing 13. The end members 20 are bolted to the casing 13 or to each other with bolts 22. In the preferred embodiment illustrated the bolts 22 extend through the inside portion of the casing 13 to the opposite end member 23 so that the end members 20 and 23 are drawn together by tightening of the nuts onto the bolts 22 thus bringing the angled portions 21 tightly onto the edges 24 of the inflatable skin 12 tightening the edges 24 against the beveled portion 18 of the casing 13. This allows for easy assembly and disassembly by merely loosening one set of bolts removing the two end portions which frees the sleeve 12 from the casing 13. Each of the members 20 and 23 may have openings 25 in the center thereof for the passage of an air line 26 and a grouting line 27 and may have skids 28 attached directly thereto for the packer 10 to ride on within a pipe 11 when the bladder 12 is deflated. It should be noted that the terms "bladder," "inflatable sleeve" and "inflatable skin" are used interchangeably to mean the sleeve 12.

In operation the packer 10 is pulled through a sewer line 11 until a fault such as a crack or opening in the pipe line 11 is located and the packing unit 10 is aligned with the fault in the pipe 11. The leak may be located in the packer and aligned with a TV camera (not shown), or the like. Air pressure or other fluid pressure is applied between the casing 13 and the sleeve 12 which inflates the bladder 12. The bladder however inflates at the end portions 14 and 15 more rapidly than at the slow inflating middle portion 16, thus engaging the interior wall of the pipe 11 with the end portions 14 and 15 and leaving a void area 30 between the end portions directly over the middle portion 16. This area can then be filled through the opening 17 connected to the grouting lines 27 to fill the void area with a fast setting grouting chemical. Additional pressure applied between the casing 13 and the inflatable sleeve 12 will further expand the middle portion 16 of the sleeve 12 applying additional pressure to the grouting chemicals located in the void 30, driving them into the fault or leak in the pipe 11 and leaving a smaller volume of grouting material to harden on the edges of the interior walls of the pipe 11.

Figure 2:
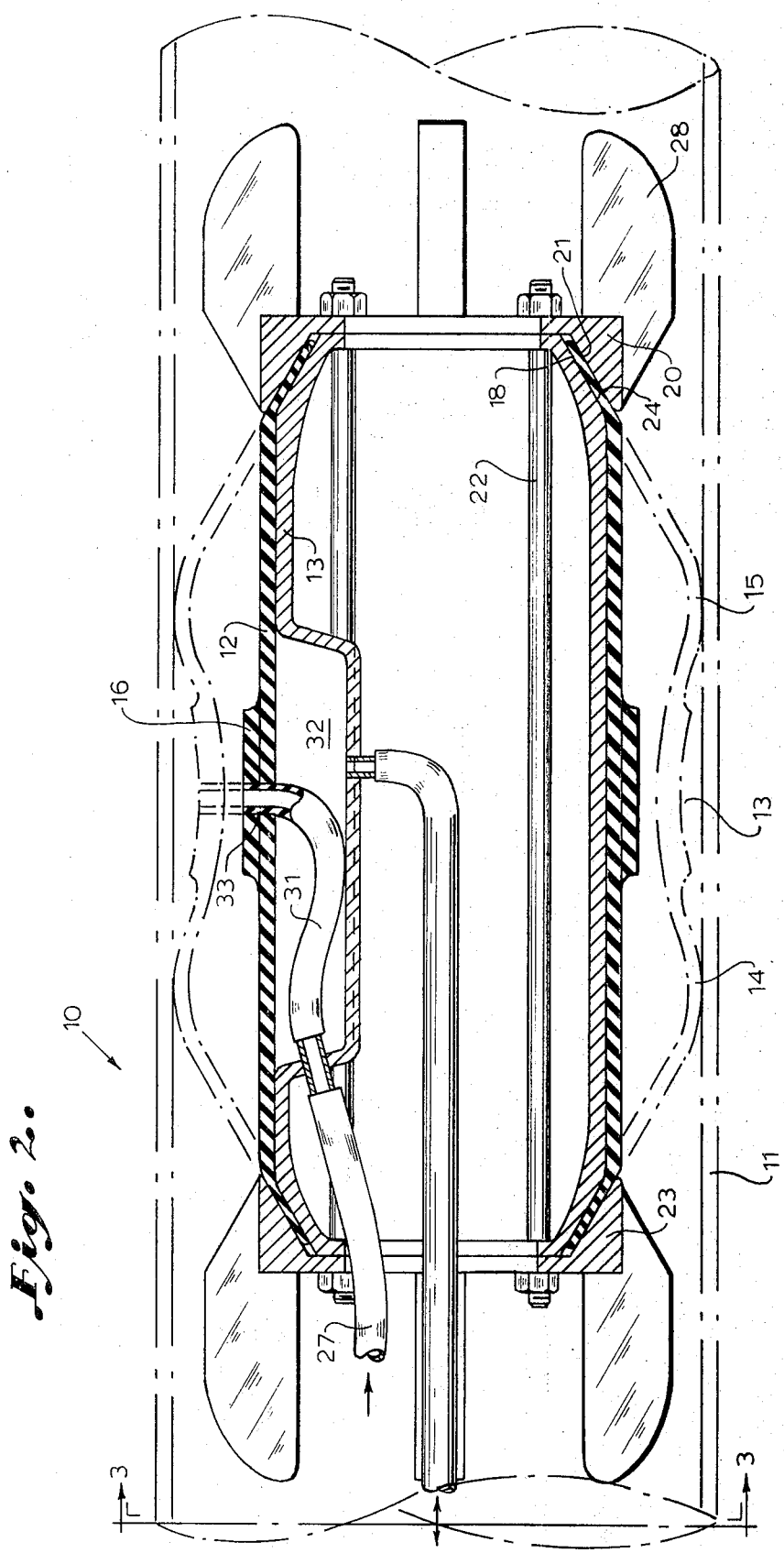
FIG. 2 is a cutaway sectional view of the embodiment of FIG. 1 showing the operation of the packer.

The operation of the packer can be more clearly seen in FIG. 2 in which the grouting line 27 would typically be a flexible line connected to a fixed line within the packer 10 but would have a flexible portion 31 located in a recessed area or pocket 32 in the casing 13. Flexible portion 31 of the grouting line would be fixedly attached at 33 to the middle portion 16 of the packer sleeve 12. For clarity, the packer sleeve 12 is shown in its deflated position with dash lines to illustrate the inflated position having the end portions 14 and 15 of the sleeve 12 engaging the interior wall of the pipe 11 leaving a void 30 between the end portions 14 and 15 and between the middle portion 13 and the interior walls of the pipe 11. This also shows the operation of the flexible pipe 31 which is allowed to move with the middle portion 16 of the sleeve 12 during expansion of the sleeve 12. The fluid line 26 would normally be a flexible air line but could utilize any fluid desired. The air line 26 is attached to the recessed area 32 of the casing 13 and passes through the casing 13 to allow the fluid to be applied between the casing 13 and the sleeve 12.

It will of course be clear that the air line 26 does not have to be attached directly to the recessed area 32 but can be attached to pass through any portion of the casing 13 located beneath the sleeve 12. This view also clearly illustrates the annular sealing and attaching of the edges 24 of the sleeve 12 by the end members 20 and 23 which have the skids 28 attached thereto by having the end members 20 and 23 being drawn towards each other by tightening of the bolts 22 drawing the members 20 and 23 towards each other onto the edges 24 of the sleeve and between the beveled edges 18 of the casing 13 and the beveled edges 21 of the end members 20 and 23.

Figure 3:
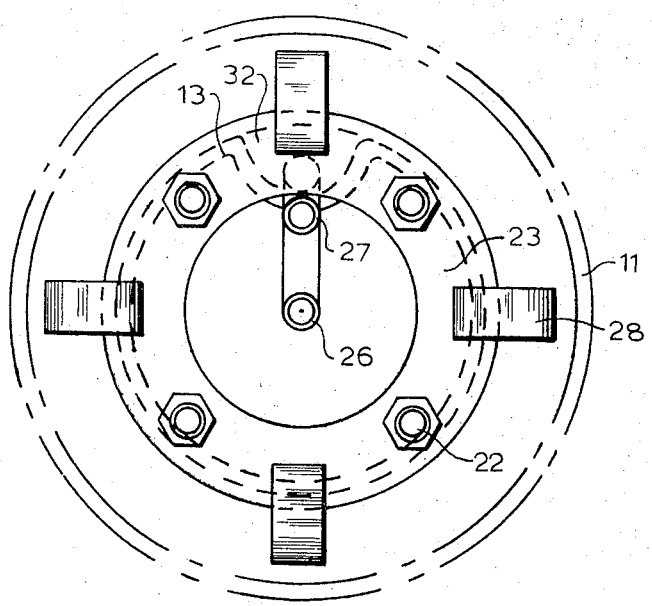
FIG. 3 is a sectional view taken along the line 3—3 of FIG. 2.

Referring now to FIG. 3, an end view shows the end member 23 having skids 28 and bolts 22 along with the pipes 26 and 27 which are connected to a recessed portion 32 of the casing 13 with the unit riding in pipe 11.

Figure 4:
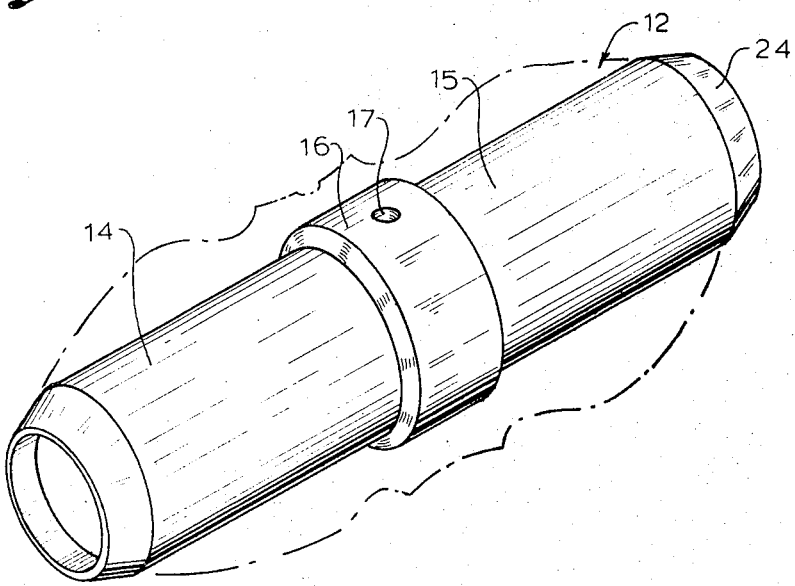
FIG. 4 is a perspective view of an inflatable sleeve for use in accordance with the embodiment of FIGS. 1–3.

FIG. 4 illustrates one embodiment of an inflatable bladder or sleeve 12 having beveled edges 24 and end portions 14 and 15 with a middle portion 16 of increased thickness having an opening 17 therethrough.

The sleeve 12 can be made of any gas impervious elastic material desired but would normally be rubber or elastomer having sufficient elasticity for inflation during the operation of the packer. The remaining components of the packer can be made of steel, cast iron or any material desired without departing from the spirit and scope of the invention. Advantageously, the present packer has the ability to seal more than one size pipe, such as an 8 inch pipe and a 10 inch pipe with the same packer since the middle portion of the inflatable sleeve is expanding with the end portions. This reduces the number of sizes of packers required to cover the different pipe sizes.

Accordingly, this invention is not to be construed as limited to the particular forms disclosed herein since these are to be regarded as illustrative rather than restrictive.

I claim;

1. A pipe leak sealing apparatus comprising in combination:
   a. a hollow casing;
   b. a gas impervious inflatable sleeve mounted over said casing, said sleeve having two end portions and a center portion, said center portion having means to reduce its expansion relative to said end portions when pressure is applied to expand said inflatable sleeve;
   c. means for attaching said two end portions of said inflatable sleeve to said cylindrical casing in a manner to seal said sleeve to said casing at each end thereof whereby fluid pressure supplied between said casing and said sleeve will inflate said sleeve;
   d. means for inflating said sleeve on said casing, said two end portions being inflatable more rapidly than said center portion, creating a void between said end portions of said sleeve when said end portions are inflated in a pipe, said means to reduce the expansion of said center portion comprising an enlarged middle portion formed by a separate sleeve located over a sleeve of generally uniform thickness thereby reducing the expansion of said center portion relative to said end portions of said sleeve;
   e. means for directing settable chemicals through said casing and through said sleeve; and
   f. said casing having a recessed area in its surface under said inflatable sleeve and said means for directing settable chemicals having a flexible chemical grouting pipe located in said recessed area and being connected to and passing through said middle portion of said inflatable sleeve whereby chemicals may flow into said void created by said expanded end portions of said sleeve and be compressed by further inflation of said sleeve center portion.

2. The apparatus in accordance with claim 1 in which said casing has a pair of skids connected thereto for said apparatus to slide on when said inflatable sleeve is deflated.

3. The apparatus in accordance with claim 2 in which said means for attaching said end portions of said inflatable sleeve includes a pair of end members each attached to one of said skids and having an annular internally beveled edge for engaging each end of said sleeve and sealing said sleeve ends to annular externally beveled ends of said casing.

4. The apparatus in accordance with claim 3 in which said end members attached to said skids are bolted together through said casing thereby drawing said end members onto said casing and sleeve.

5. The apparatus in accordance with claim 4 in which each end portion of said inflatable sleeve is beveled.

6. The apparatus in accordance with claim 1 in which said means for inflating said sleeve include an air line attached to and passing through said recessed area in said casing.

* * * * *